June 28, 1932.   L. DAUM   1,865,356
SLIPPING COUPLING, MORE PARTICULARLY FOR GUN LAYING MECHANISM
Filed Sept. 30, 1931   4 Sheets-Sheet 1

INVENTOR.
Léon Daum.
BY Cameron, Kerkam & Sutton
ATTORNEYS.

June 28, 1932.  L. DAUM  1,865,356

SLIPPING COUPLING, MORE PARTICULARLY FOR GUN LAYING MECHANISM

Filed Sept. 30, 1931   4 Sheets-Sheet 2

INVENTOR
Léon Daum.
BY Cameron, Kerkam & Sutton
ATTORNEYS.

June 28, 1932. L. DAUM 1,865,356
SLIPPING COUPLING, MORE PARTICULARLY FOR GUN LAYING MECHANISM
Filed Sept. 30, 1931 4 Sheets-Sheet 4

INVENTOR.
Léon Daum.
BY Cameron, Kerkam & Sutton.
ATTORNEYS.

Patented June 28, 1932

1,865,356

UNITED STATES PATENT OFFICE

LEON DAUM, OF PARIS, FRANCE, ASSIGNOR OF ONE-HALF TO SCHNEIDER & CIE., OF PARIS, FRANCE, A COMPANY OF FRANCE, AND ONE-HALF TO COMPAGNIE DES FORGES ET ACIERIES DE LA MARINE ET D'HOMECOURT, OF PARIS, FRANCE, A COMPANY OF FRANCE

SLIPPING COUPLING, MORE PARTICULARLY FOR GUN-LAYING MECHANISM

Application filed September 30, 1931, Serial No. 566,125, and in France November 19, 1930.

The present invention relates to gun-laying mechanisms which are provided with a coupling between the gun to be laid and the driving gear, the said coupling being adapted to yield under the effect of a predetermined abnormal force emanating from the gun to be laid.

In mechanisms for laying naval or other guns, where the gun to be laid may receive from any causes whatsoever, (such as, for instance, the abrupt movements of the support, ship or the like) considerable forces of short duration, coupling devices are provided on the transmission gear which are adapted to yield when the abnormal force has attained a predetermined value.

Usually the transmission mechanisms comprise an irreversible worm and worm wheel gear, and the yieldable coupling associated with this irreversible transmission gear comprises friction or slipping elements some of which are integral with the worm wheel which is loose on its shaft and others with a member which is fast on the said shaft. When, under the effect of an abnormal force, that is to say, a force greater than a predetermined value, the worm wheel ceases to be driven owing to the two elements of the friction coupling sliding relatively to one another, the latter are displaced angularly relatively to one another, and the result of this displacement is a permanent error of aim of the gun.

This disadvantage becomes serious and inadmissible in practice in the case of remote-controlled gun laying particularly when the said remote-controlled gun laying has to ensure the simultaneous laying of a plurality of guns firing at one and the same objective.

The present invention enables the said disadvantage to be completely obviated and it is characterized in principle in that the yieldable coupling provided in the gun-laying mechanism comprises an opposing means which, once the cause producing the yielding action has disappeared, ensures the return of the members into their driving position and consequently automatically reestablishes the correct aim.

The opposing means may, of course, be constructed in various ways, but in all cases it must be so constructed that the relative angular displacement between the member which is mounted loosely on the driving shaft and the member which is keyed to the said shaft cannot in any case become permanent, as occurs with the customary friction disc yieldable coupling.

Two practical constructional forms of the invention are shown by way of example in the accompanying drawings wherein.

Figure 1:
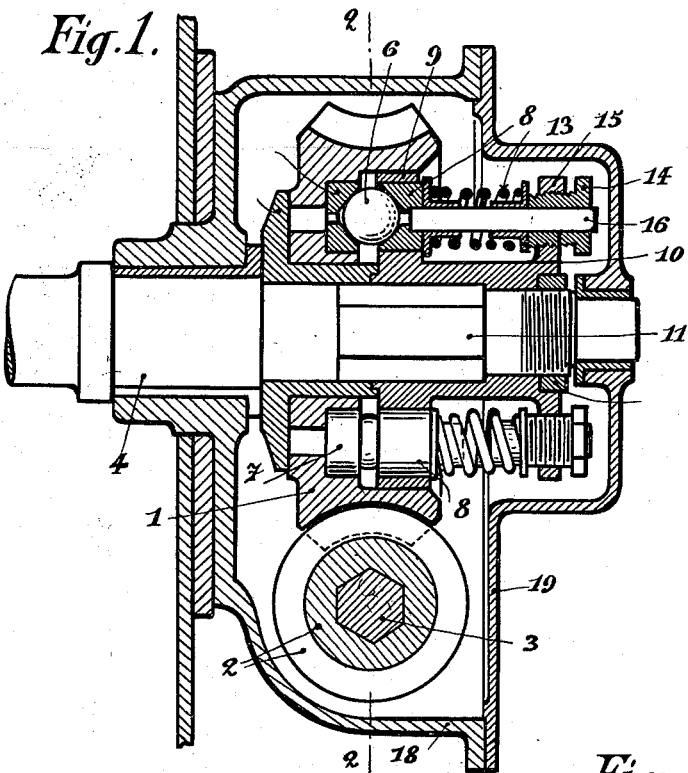
Figures 1 and 2 show, respectively, in cross-sectional elevation and section along the line 2—2 in Figure 1, a constructional form of the yieldable coupling with automatic return device provided between a shaft and a worm wheel mounted loosely on the said shaft, which latter may for example carry a pinion engaging directly with the elevating sector of the gun.
Figure 3:
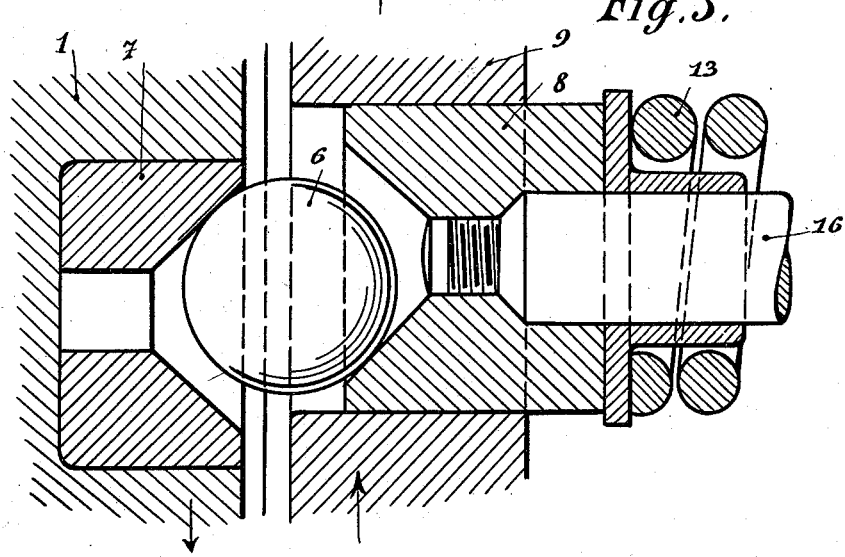
Figure 3 shows a part of the device in section and on a larger scale, the parts of the yieldable coupling being shown in the released position.
Figure 2:
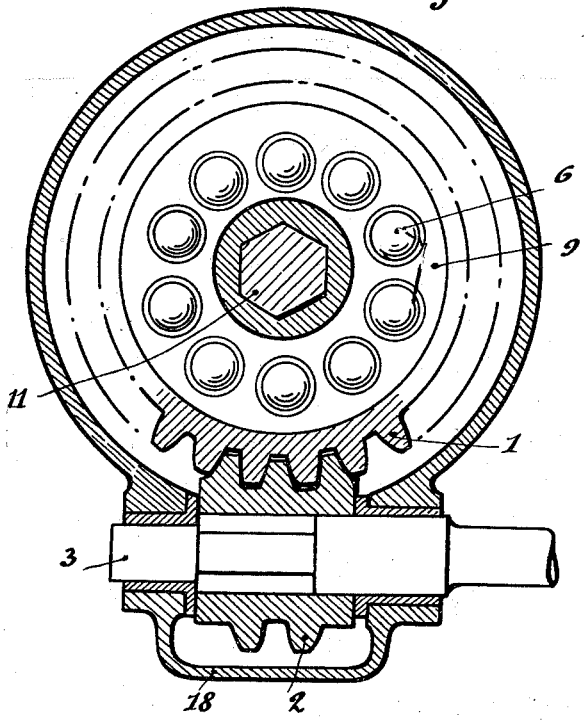

In Figures 1 to 5, a worm wheel 1 engages a worm 2 keyed to a shaft 3 which receives the power required for the gun-laying operations. The worm wheel 1 is mounted loosely on its shaft 4 and the yieldable coupling with return device is arranged between the said loose wheel and a member 10 keyed to the same shaft. Worm wheel 1 and member 10 constitute the driving and driven members, respectively, of an irreversible transmission.

In the example shown, this return coupling is constituted as follows:

In the wheel 1, loosely mounted on the bush 5 which is keyed to the shaft 4 and serves as a supporting collar for the wheel, there are provided a number of recesses in which are accommodated blocks 7 forming conical supporting and centering cups for driving members such as balls 6. A complementary sliding support for the said balls is provided in the complementary coupling member, which in this construction is constituted by a disc 9 formed on a sleeve 10 keyed on the shaft 4 provided for this purpose with a portion 11 of polygonal section, the sleeve 10 being retained in the longitudinal direction by a nut 12.

Each of the counter-cups 8 is pressed against the corresponding ball 6 by a spring 13, one end of which bears against the counter-cup and the other against a nut 14, of adjustable position and adapted to be displaced in a corresponding screw-thread in a collar 15 of the sleeve 10. The nut 14 is adapted to serve as guide for a rod 16 fixed to the counter-cup.

The whole of the worm and worm wheel gear forming the return coupling may be accommodated in a casing 18 provided with a cover 19.

Figure 4:
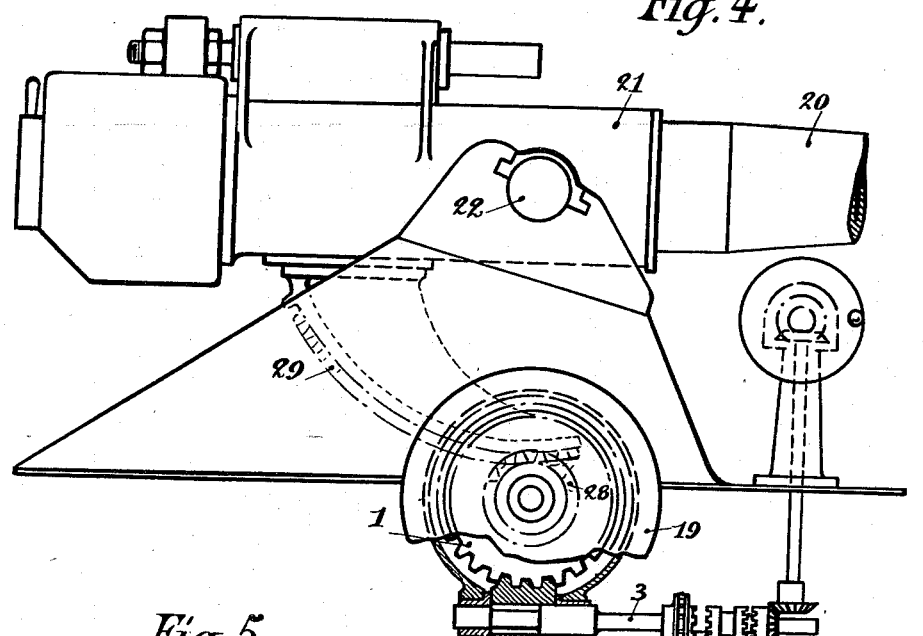
Figures 4 and 5 show, respectively, in elevation with parts in section and in cross-sectional elevation, the yieldable coupling with return device as applied to the elevating mechanism of a gun.
Figure 5:
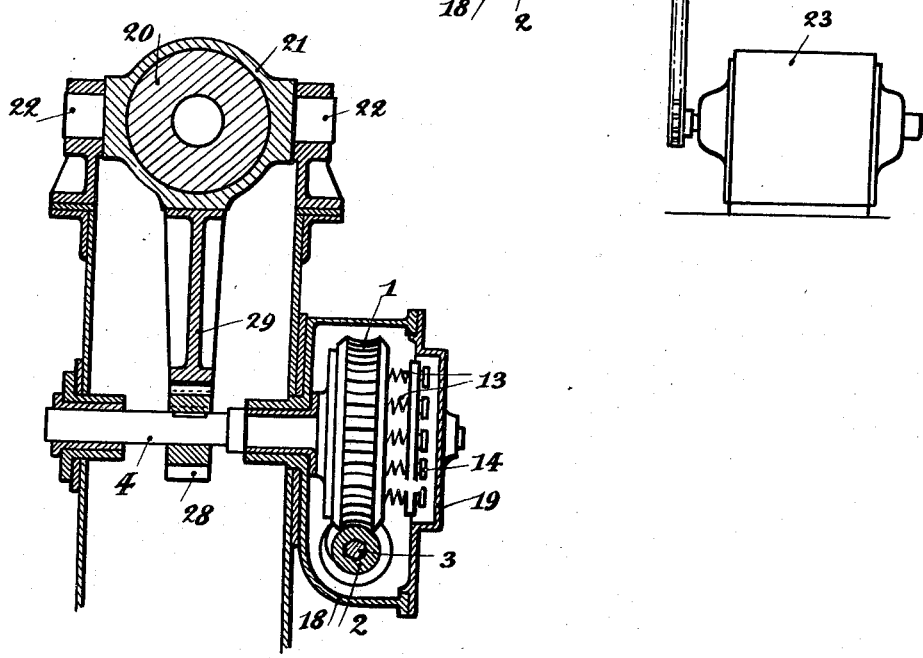

The device which has been described in the foregoing, the mode of working of which will be explained hereinafter, may be provided as shown in Figures 4 and 5, in the elevating mechanism for example.

In this case, the shaft 4 on which the worm wheel 1 is mounted loosely, is journalled in the gun carriage and carries a pinion 28 meshing with an elevating sector 29. A worm 2 is keyed on a shaft 3 which carries, in the usual manner, clutch elements for driving the elevating mechanism either by hand transmission, terminating in a handwheel 24, or by an electric or other motor 23.

The yieldable coupling with return device works as follows:

When the shaft 3 is set in motion by one or other of the means referred to, the worm 2 drives the worm wheel 1. By means of the latter, the cups 7 drive the balls 6 and rigidity between the wheel and the shaft 4 is established by the said balls being constantly pressed against the cups 7 by the springs 13. As long as the torque to be transmitted is such that the reaction of the balls 6 on the conical wall of the counter-cups 8 is less than the tension of the spring 13, the action of the balls merely results in the rotation of the plate 9 and consequently of the shaft 4 without any displacement being produced between the wheel and the said plate 9.

When, for any cause whatsoever, the gun to be elevated transmits through the shaft 4 to the plate 9 a torque greater than that for which the tension of the springs 13 is regulated, a displacement is produced between the plate 9 and the wheel 1. This effect is shown partially for one of the balls of the system in Figure 3.

Once the cause which produced the said displacement has disappeared, the balls return to their normal initial position shown in Figure 1. It will be clear that the abnormal force emanating from the gun to be elevated produces, during the displacement of the balls, a loss of aim but the correction of this loss of aim is ensured automatically once the balls have returned into their normal position.

In applying the invention to elevating mechanism the tension of the springs will be so regulated that the coupling remains rigid under the equilibrium-destroying force resulting from the recoil of the gun at the moment of firing, and much more so under the force necessary for elevating.

It is obvious that the device described in the foregoing may be provided in a training mechanism acting by angular displacement of the gun on its carriage.

In the case of the application to a turret-mounted gun, the device will be located in the turret-rotating mechanism.

Figures 6 to 9 show a modification wherein more than one crown of balls such as those described in the foregoing example is employed, for example two rings, an intermediate sliding support or floating coupling member 30 being arranged in the form of a crown having opposite cups between a first crown of balls 6 and a second crown of balls 6', the latter forming a support for the sliding counter-cups 8. The crown 30 is adapted both to slide in a recess of the wheel 1 and to turn in the said recess about the bush 5.

Figure 7:
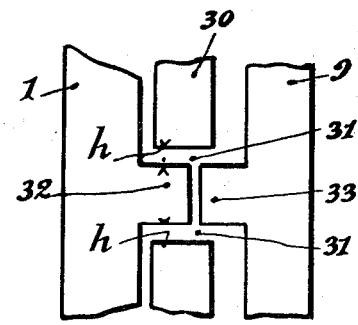
Figures 7, 8 and 9 show in plan and in part sectional plan in development, details illustrating the working of the device shown in Figure 6.

In the interior surface of the crown 30 there is provided a recess 31, shown more particularly in development by the views from below in Figures 7 and 9. Projections 32 and 33 formed respectively on the hub of the worm wheel 1 and on the hub of the bush 9—10—15 engage the said slot 31.

Figure 6:
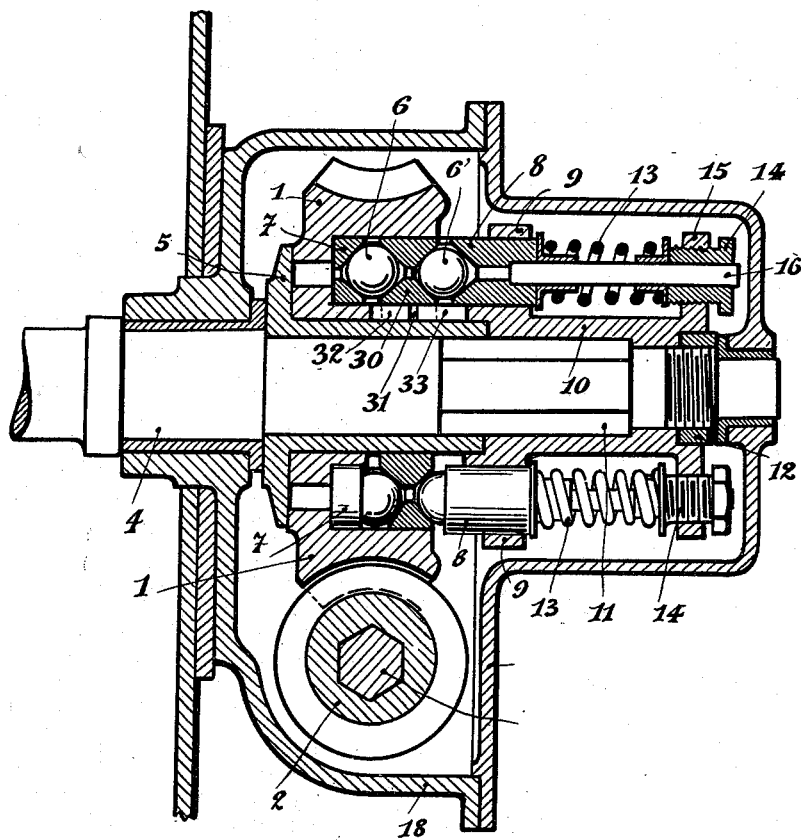
Figure 6 is a cross-sectional elevation of a modification.

When the members occupy the normal operating position as shown in Figure 6, the balls are maintained centered, by the pressure of the springs 13, in the cups of the crowns 7 and 8 and bear against the bottom of the corresponding cups of the intermediate crown 30. The projections 32 and 33 then occupy the mean position shown in Figure 7 and the play $h$ on either side of the projections, between the latter and the walls of the recess 31, corresponds to the maximum admissible displacement between the wheel 1 and the intermediate crown 30, or between the latter and the plate 9 formed on the bush 9—10—15.

At the moment when a force greater than that which is predetermined for the working of the system as a rigid coupling is produced, the total maximum displacement between the wheel 1 and the plate 9 may attain, according to the force acting, the maximum amplitude permitted by the abutment of the projections 32 and 33 against the opposite edges of the recess.

Figure 8:
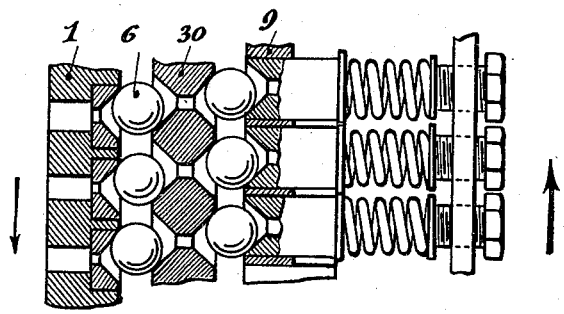
Figure 9:
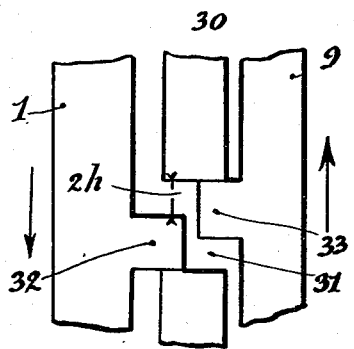

Figures 8 and 9 show the position of maximum displacement $(2h)$. It will thus be seen that the use of an intermediate crown and two sets of balls allows a displacement which is double that allowed with a single set of balls, other things remaining the same. In other respects the device functions in exactly the same way as the preceding example.

The device for limiting the displacement, comprising projections formed respectively on the hub of the wheel 1 and on the plate 9, in every case prevents the balls escaping from their recesses. This device may likewise be applied in the constructional form shown in Figures 1 to 3, it being merely necessary to make a recess in one of the members, the hub of the wheel 1 for example, and to provide a projection on the complementary member 9 to engage therein. The play is then limited by the relative displacement between the wheel and the disc 9.

Claims:

1. In a gun laying mechanism, a driving member adapted to be actuated by the gun layer, a driven member the movements of which correspond to those of the gun to be laid, and a coupling interposed between and entirely supported by the driving and driven members and adapted to yield so as to permit relative displacement of said members under the action of an abnormal force of greater than a predetermined value emanating from said gun, said coupling including means for automatically returning said members to their original driving positions upon cessation of said abnormal force.

2. In a gun laying mechanism, a driving member adapted to be actuated by the gun layer, a driven member the movements of which correspond to those of the gun to be laid, and a coupling interposed between said driving and driven members and adapted to yield so as to permit relative displacement of said members under the action of an abnormal force of greater than a predetermined value emanating from said gun, said coupling including means for exerting a displacement opposing force in a direction parallel to the axis of one of said members for automatically returning said members to their original driving positions upon cessation of said abnormal force.

3. In a gun laying mechanism, a driving member adapted to be actuated by the gun layer, a driven member the movements of which correspond to those of the gun to be laid, said driving and driven members being substantially coaxial, and a coupling interposed between said driving and driven members and adapted to yield so as to permit relative displacement of said members under the action of an abnormal force of greater than a predetermined value emanating from said gun, said coupling including means for exerting a displacement opposing force in a direction parallel to the axes of said members for automatically returning said members to their original driving positions upon cessation of said abnormal force.

4. In a gun laying mechanism, a driving member adapted to be actuated by the gun layer, a driven member the movements of which correspond to those of the gun to be laid, and a yieldable coupling interposed between said members and adapted to permit relative rotational displacement thereof under the action of an abnormal force of greater than a predetermined value emanating from said gun including means operatively connected to one of said members for rotation therewith and capable of both rotational and axial movement relative to the other of said members, and means for exerting a force opposing said relative axial movement for automatically returning said members to their original driving positions upon cessation of said abnormal force.

5. In a gun laying mechanism of the type embodying a driving member adapted to be actuated by the gun layer and a driven member the movements of which correspond to those of the gun to be laid, a coupling interposed between said driving and driven members and adapted to yield so as to permit relative displacement of said driving and driven members under the action of an abnormal force of greater than a predetermined value emanating from said gun comprising a coupling member carried by said driving member, a second coupling member carried by said driven member and mounted for both rotational and axial movement relative to said first coupling member in response to said abnormal force, and means for exerting a force opposing said relative axial movement for automatically returning said members to their original driving positions upon cessation of said abnormal force.

6. In a gun laying mechanism of the type embodying a driving member adapted to be actuated by the gun layer and a driven member the movements of which correspond to those of the gun to be laid, a yieldable coupling interposed between said driving and driven members comprising a coupling member carried by said driving member, a second coupling member carried by said driven member, wedging means associated with said coupling members whereby the exertion of an abnormal force of greater than a predetermined value emanating from said gun produces both a rotational and an axial displacement of said coupling members relative to one another, and means resiliently opposing said axial displacement for automatically returning all of said members to their original driving positions upon cessation of said abnormal force.

7. In a gun laying mechanism, a transmission including a driving member adapted to be actuated by the gun layer and a driven member the movements of which correspond to those of the gun to be laid, the direction of transmission drive being irreversible, and a yieldable coupling interposed between said driving and driven members and adapted to permit rotation of said driven member relatively to said driving member under the action of an abnormal force emanating from the gun, said coupling including a coupling member coaxial with said driving and driven members, means for imparting axial movement to said coupling member upon rotation of said driven member relatively to said driving member, and means resiliently opposing said axial movement for automatically returning all of said members to their original driving positions upon cessation of said abnormal force.

8. In a gun laying mechanism of the type embodying an irreversible transmission having a driving member adapted to be actuated by the gun layer, and a driven member the movements of which correspond to those of the gun to be laid, a yieldable coupling interposed between said driving and driven members comprising a coupling member carried by said driving member, a second coupling member carried by said driven member, each of said coupling members being provided with inclined surfaces opposing one another, rolling means interposed between said inclined surfaces whereby the exertion of an abnormal force of greater than a predetermined value emanating from said gun produces both a rotational and an axial displacement of said coupling members relative to one another, and means resiliently opposing said axial displacement for automatically returning all of said members to their original driving positions upon cessation of said abnormal force.

9. In a gun laying mechanism of the type embodying an irreversible transmission having a driving member adapted to be actuated by the gun layer and a driven member the movements of which correspond to those of the gun to be laid, a yieldable coupling interposed between said driving and driven members comprising a coupling member carried by said driving member, a second coupling member carred by and movable axially with respect to said driven member, each of said coupling members being provided with inclined surfaces opposing one another, rolling means interposed between said inclined surfaces whereby the exertion of an abnormal force of greater than a predetermined value emanating from said gun produces both a rotational and an axial displacement of said second coupling member with respect to said first named coupling member, and means resiliently opposing said axial displacement for automatically returning all of said members to their original driving positions upon cessation of said abnormal force.

10. In a gun laying mechanism of the type embodying an irreversible transmission having a driving member adapted to be actuated by the gun layer and a driven member the movements of which correspond to those of the gun to be laid, a yieldable coupling interposed between said driving and driven members comprising a coupling member carried by said driving member, a second coupling member carried by and movable axially with respect to said driven member, each of said coupling members being provided with inclined surfaces opposing one another, rolling means interposed between said inclined surfaces whereby the exertion of an abnormal force of greater than a predetermined value emanating from said gun produces both a rotational and an axial displacement of said second coupling member with respect to said first named coupling members, means for positively limiting the extent of said rotational displacement, and means resiliently opposing said axial displacement for automatically returning all of said members to their original driving positions upon cessation of said abnormal force.

11. In a gun laying mechanism of the type embodying an irreversible transmission having a driving member adapted to be actuated by the gun layer and a driven member the movements of which correspond to those of the gun to be laid, a yieldable coupling interposed between said driving and driven members comprising a plurality of recessed members fixed with respect to said driving member, a plurality of corresponding recessed members mounted in said driven member for rotation therewith and axial movement relative thereto, rolling means interposed between said recessed members whereby the exertion of an abnormal force of greater than a predetermined value emanating from said gun produces both a rotational displacement of said driven member and its associated recessed members and an axial displacement of said last named members with respect to said driving member and its associated recessed members, and means resiliently opposing said axial displacement for automatically returning said driven member and its associated recessed members to their original driving positions with respect to said driving member upon cessation of said abnormal force.

12. In a gun laying mechanism of the type embodying an irreversible transmission having a driving member adapted to be actuated by the gun layer and a driven member the movements of which correspond to those of the gun to be laid, a yieldable coupling interposed between said driving and driven members comprising a plurality of recessed members fixed with respect to said driving member, a plurality of corresponding recessed members mounted in said driven member for rotation therewith and axial movement relative thereto, rolling means interposed between said recessed members whereby the exertion of an abnormal force of greater than a predetermined value emanating from said gun produces both a rotational displacement of said driven member and its associated recessed members and an axial displacement of said last named members with respect to said driving member and its associated recessed members, and spring members carried by said driven member and resiliently urging the recessed members associated therewith toward the opposite recessed members carried by said driving member, said spring members being adapted to be compressed upon the axial displacement of said recessed members under the action of said abnormal force and to automatically return said driven member and its associated recessed members to their original driving positions with respect to said driving member upon cessation of said abnormal force.

13. In a gun laying mechanism of the type embodying an irreversible transmision having a driving member adapted to be actuated by the gun layer and a driven member the movements of which correspond to those of the gun to be laid, a yieldable coupling interposed between said driving and driven members comprising a plurality of recessed members fixed with respect to said driving member, a plurality of corresponding recessed members mounted in said driven member for rotation therewith and axial movement relative thereto, a floating coupling member interposed between said driving and driven members and recessed on both sides thereof, roller means interposed between the recessed surfaces of said floating member and the adjacent recessed members carried by said driving and driven members whereby the exertion of an abnormal force of greater than a predetermined value emanating from said gun produces both a rotational displacement of said driven member, its associated recessed members and said floating member, and an axial displacement of said last named recessed and floating members, with respect to said driving member and its associated recessed members, and means resiliently opposing said axial displacement for automatically returning said driven member, its associated recessed members and said floating member to their original driving positions with respect to said driving member upon cessation of said abnormal force.

14. In a gun laying mechanism of the type embodying an irreversible transmission having a driving member adapted to be actuated by the gun layer and a driven member the movements of which correspond to those of the gun to be laid, a yieldable coupling interposed between said driving and driven members comprising a plurality of recessed members fixed with respect to said driving member, a plurality of corresponding recessed members mounted in said driven member for rotation therewith and axial movement relative thereto, a floating coupling member interposed between said driving and driven members and recessed on both sides thereof, roller means interposed between the recessed surfaces of said floating member and the adjacent recessed members carried by said driving and driven members whereby the exertion of an abnormal force of greater than a predetermined value emanating from said gun produces both a rotational displacement of said driven member, its associated recessed members and said floating member, and an axial displacement of said last named recessed and floating members, with respect to said driving member and its associated recessed members, means for positively limiting the extent of said rotational displacement, and means for exerting a force opposing said axial displacement for automatically returning said driven member, its associated recessed members and said floating member to their original driving positions with respect to said driving member upon cessation of said abnormal force.

15. In a gun laying mechanism, a transmission including a driving member adapted to be actuated by the gun layer and a driven member the movements of which correspond to those of the gun to be laid, the direction of transmission drive being irreversible, and a yieldable coupling interposed between said driving and driven members comprising a coupling member carried by said driving member, a second coupling member carried by said driven member, an intermediate floating coupling member interposed between said first and second coupling members and having inclined surfaces on opposite sides thereof, rolling means interposed between the inclined surfaces of said intermediate floating coupling member and the adjacent first and second coupling members whereby the exertion of an abnormal force of greater than a predetermined value emanating from said gun produces both a rotational and an axial displacement of said intermediate and said second coupling members with respect to said first coupling member, means for positively limiting the amount of said rotational displacement including cooperating projections and recesses formed on said first, second and intermediate coupling members, and means resiliently opposing said axial displacement for automatically returning all of said members to their original driving positions upon cessation of said abnormal force.

In testimony whereof I have signed this specification.

LEON DAUM.